United States Patent
Zisk, Jr. et al.

(10) Patent No.: US 7,168,311 B2
(45) Date of Patent: Jan. 30, 2007

(54) FIBER OPTIC MONITORING OF FLOW INSIDE AND OUTSIDE A TUBE DOWNHOLE

(75) Inventors: Edward J. Zisk, Jr., Kingwood, TX (US); Terry Bussear, Round Rock, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/251,691

(22) Filed: Sep. 20, 2002

(65) Prior Publication Data

US 2003/0126921 A1 Jul. 10, 2003

Related U.S. Application Data

(60) Provisional application No. 60/323,780, filed on Sep. 20, 2001.

(51) Int. Cl.
*E21B 47/10* (2006.01)
(52) U.S. Cl. ................... 73/152.31; 73/152.18
(58) Field of Classification Search ............ 73/152.18, 73/152.09, 152.21, 152.24, 152.31; 356/501, 356/35.5; 166/295, 297, 382; 254/134.4; 507/202
See application file for complete search history.

(56) References Cited

U.S. PATENT DOCUMENTS

| | | | | |
|---|---|---|---|---|
| 4,274,283 A | * | 6/1981 | Maus et al. | 73/152.22 |
| 4,496,012 A | * | 1/1985 | Savins | 175/65 |
| 4,794,535 A | * | 12/1988 | Gray et al. | 702/9 |
| 4,821,564 A | * | 4/1989 | Pearson et al. | 73/152.31 |
| 4,879,899 A | * | 11/1989 | Leehey | 73/147 |
| 4,896,098 A | * | 1/1990 | Haritonidis et al. | 324/663 |
| 4,942,767 A | * | 7/1990 | Haritonidis et al. | 73/705 |
| 4,986,122 A | | 1/1991 | Gust | 73/204.15 |
| 5,052,228 A | * | 10/1991 | Haritonidis | 73/705 |

(Continued)

FOREIGN PATENT DOCUMENTS

EP 0 570 052 A2 5/1993

OTHER PUBLICATIONS

Fakulti Kejuruteraan, Chapter Four, Nov. 7, 2001 Hughes et al, Schaum's Outline of Theory and Problems of Fluid Dynamics, 1967, McGraw-Hill, pp. 237-238.*

(Continued)

*Primary Examiner*—Hezron Williams
*Assistant Examiner*—John Fitzgerald
(74) *Attorney, Agent, or Firm*—Cantor Colburn LLP

(57) ABSTRACT

An apparatus and method for monitoring and characterizing the fluid flow in and around the tubing string in a wellbore, preferably using fiber optic componentry. The apparatus includes a signal sensing demodulator device and a skin friction sensing device positionable within the wellbore. Both devices are in informational communication with each other. The method includes exposing the skin friction sensing device to a fluid flow, transmitting a signal obtained as a result of a movement of the skin friction sensing device from the fluid flow to a signal sensing demodulator device, converting the signal to a numerical value, and computing a parameter or parameters of the fluid flow in the wellbore from the numerical value.

15 Claims, 4 Drawing Sheets

U.S. PATENT DOCUMENTS

| | | | | |
|---|---|---|---|---|
| 5,199,298 | A * | 4/1993 | Ng et al. | 73/54.01 |
| 5,301,001 | A * | 4/1994 | Murphy et al. | 356/35.5 |
| 5,339,899 | A * | 8/1994 | Ravi et al. | 166/250.14 |
| 5,410,152 | A * | 4/1995 | Gadeken | 250/260 |
| 5,872,317 | A * | 2/1999 | Gruszczynski et al. | 73/841 |
| 5,892,860 | A * | 4/1999 | Maron et al. | 385/12 |
| 6,068,394 | A * | 5/2000 | Dublin, Jr. | 702/43 |
| 6,341,532 | B1 * | 1/2002 | Xu et al. | 73/841 |
| 6,426,796 | B1 * | 7/2002 | Pulliam et al. | 356/501 |
| 6,601,458 | B1 * | 8/2003 | Gysling et al. | 73/861.04 |
| 6,913,079 | B1 * | 7/2005 | Tubel | 166/250.01 |
| 2001/0020675 | A1 * | 9/2001 | Tubel et al. | 250/227.11 |
| 2003/0055565 | A1 * | 3/2003 | Omeragic | 702/7 |

OTHER PUBLICATIONS

Agarwal et al., "An investigation of wellbore storage and skin effect in unsteady liquid flow: I. analytical treatment", American Institute of Mining, Metallurgical, and Petroleum Engineers, Inc. pp. 279-289.*

Kersey, "A Review of Recent Developments in Fiber Optic Sensor Technology" XP-002053711, 1996, pp. 291-317.*

PCT International Search Report.

* cited by examiner

FIBER OPTIC MONITORING OF FLOW INSIDE AND OUTSIDE A TUBE DOWNHOLE

CROSS REFERENCE TO RELATED APPLICATIONS

This application claims the benefit of an earlier filing date from U.S. Provisional Application Ser. No. 60/323,780 filed Sep. 20, 2001, the entire disclosure of which is incorporated herein by reference.

BACKGROUND

Related Art

Fluid flow in a wellbore is typically measured such that an overall or average fluid velocity is ascertained from pressure-sensing instrumentation placed downhole in the wellbore. The analyses of the dynamics of fluid flow in a wellbore typically rely on complex mathematical models that generally predict flow characteristics and do not necessarily accurately depict the fluid flow in the wellbore in real-time. Previous methods for the measurement of flow characteristics in wellbore applications utilized "indirect" measurements of skin friction; however, such methods presuppose some a priori knowledge of the flow, such as data that can be used to establish correlative or theoretical principles. Various examples of such methods include measurement of wall heat transfer, measurement of heat transfer from a hot wire, or thinning of an oil film on the surface of the fluid for which the flow characteristics are to be predicted. Such methods work for cases where the flows of the fluid are already well understood. They are generally not, however, well-suited or reliable for complex situations in which the flows include eddies or are otherwise three dimensional, are at unsteady state, flow near or around rough or curved walls, flow subject to injection or suction, or mix with foreign fluid injection or high-speed flows, especially those with impinging shock waves, high enthalpies, and/or combustive tendencies.

SUMMARY

An apparatus and method for monitoring and characterizing the fluid flow in and around the tubing string in a wellbore using signal sensors is disclosed herein. The apparatus includes a signal sensing demodulator device and a skin friction sensing device positionable within the wellbore. Both devices are in informational communication with each other. In a preferred embodiment, both devices are configured with fiber optic componentry and utilize fiber optic transmission lines to transmit the information therebetween. The skin friction sensing device is typically mounted within a surface of a tubing string in the wellbore and is engagable by a fluid flowing adjacent to the tubing string. A plurality of skin friction sensing devices may be circumferentially arranged about both the inside surface and the outside surface of the tubing string to engage fluids flowing adjacent to either or both of the corresponding surfaces. The signal sensing demodulator device may be located either at the surface of the wellbore, at a downhole location in the wellbore, or at a point distant from the wellbore.

The method for determining fluid flow characteristics in the wellbore includes exposing the skin friction sensing device to a fluid flow, transmitting a signal obtained as a result of a movement of the skin friction sensing device from the fluid flow to a signal sensing demodulator device, converting the signal to a numerical value, and computing a parameter of the fluid flow in the wellbore from the numerical value. Exposure of the skin friction sensing device to the fluid flow is attained by mounting the skin friction sensing device in the tubing string wall such that it can be engaged by the fluid flow and measuring the direction and drag force associated with the fluid flow. In a preferred embodiment, fiber optic componentry is utilized to sense the skin friction, transmit information, and receive the information in the demodulator device.

Such an apparatus and method allows for the quantification of shear force and direction of force of a fluid at a multitude of points along the flow path of the fluid, which in turn allow for the characterization of non-uniform flows associated with oil wells in which the tubing is non-vertical.

BRIEF DESCRIPTION OF THE DRAWINGS

Referring now to the drawings wherein like elements are numbered alike in the several FIGURES.

DETAILED DESCRIPTION

The characteristics of the flow rate and the fluid flow direction of downhole wellbore fluids can be determined through the use of a fiber optic skin friction sensor, as shown and described below. Skin friction sensors measure the shear force (which is proportional to a velocity gradient of the fluid flow) associated with fluid flow past the sensor. As flow rate increases, the shear force of the flow applied to the sensor increases. The shear force of the flow effectuates a positional change in the sensor, which is translated into a quantitative value that is used to determine the rate of flow past the sensor. The direction of the flow can also be derived by resolving the direction of the applied shear force.

The ability to quantify shear force and the direction of force at several points along the flow path can be used to characterize non-uniform flows of downhole wellbore fluids in non-vertical environments. Additional parameters such as fluid density and viscosity can also be calculated based on data developed from liquid flow characterization tests. Furthermore, complex flow fields involving fluids of different phases or due to different types of fluids can also be quantified when other fluid parameters such as fluid density, fluid capacitance and fluid resistivity are known. For example, average flow rate for single or multi-phase fluids flowing through the tubular where the sensing devices are located, and the percentage of each fluid phase at the cross-section where the sensing devices are located, can be determined.

Figure 1:
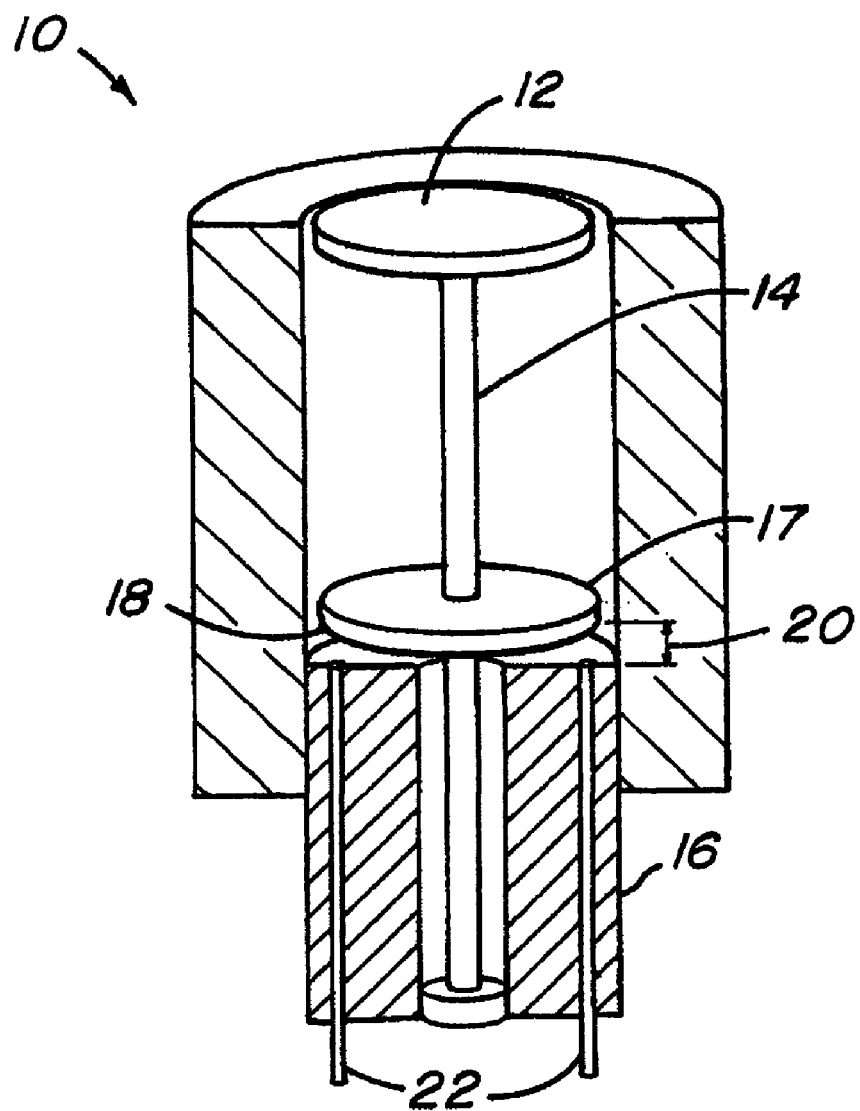
FIG. 1 is a perspective view of a cross section of a fiber optic skin friction sensor.

Referring to FIG. 1, a typical fiber optic skin friction sensor is shown generally at 10 and is referred to hereinafter as "sensor 10". Sensor 10 includes a floating head 12 (also called a moving wall) that is capable of making a direct measurement of a force exerted thereon by the flow of a fluid (not shown) engaging floating head 12. Floating head 12 is mounted to a first end of a rod 14 such that floating head 12 "floats" within an opening in a body portion 16 of sensor 10. A second end of rod 14 is pivotally secured inside body portion 16 of sensor 10. A disk 17 is fixedly secured at a point intermediate the first and second ends of rod 14 to define a gap 20 between disk 17 and body portion 16. Movement of floating head 12 and disk 17 occurs in response to the effects of the shear force exerted by the flow of the fluid.

A reflective surface 18 is fixedly disposed on a surface of disk 17 that is adjacent to gap 20. Reflective surface 18 is configured and positioned such that light introduced into gap 20 through optical fibers 22 is reflected off reflective surface 18 and is returned through optical fibers 22. The position of disk 17 relative to the position of sensors (not shown) disposed on a surface opposing reflective surface 18 is a function of the shear force applied to floating head 12. Using interferometric techniques, the sensors measure the angular position of disk 17 relative to the point at which light is introduced into gap 20. As the position of floating head 12 is altered by the shear force of the fluid flow, the characteristics of the light transmitted back to the sensors off reflective surface 18 from optical fibers 22 are altered. Changes in these characteristics are interpreted as distances that floating head 12 is displaced from a non-flow position, from which the fluid dynamics of the system can be discerned.

Figure 2:
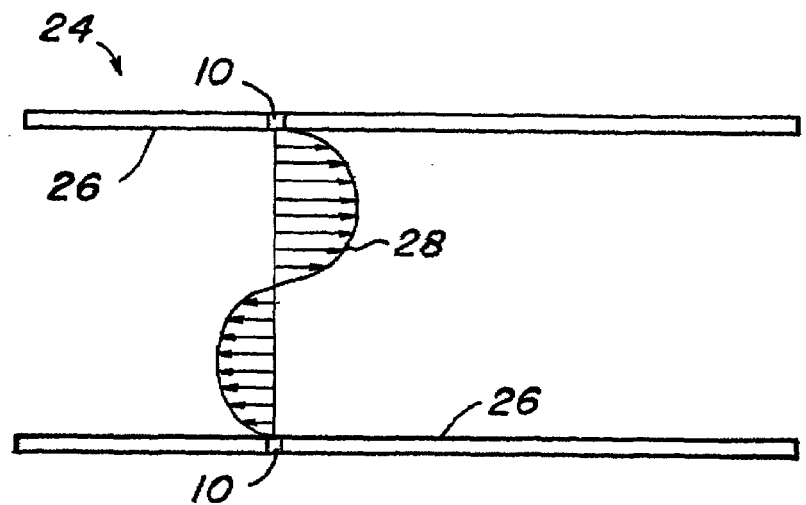
FIG. 2 is a schematic view of a cross section of a tubing string through which a fluid flows.

Referring to FIG. 2, a wellbore is shown generally at 24. Wellbore 24 comprises a tubing string 26 through which a fluid (not shown) flows. A flow profile for the fluid in tubing string 26 is shown at 28. Flow profile 28 may be in either direction or both directions within tubing string 26, as evidenced by opposing arrows radiating from a cross sectional slice of wellbore 24. Tubing string 26 is defined by a continuous wall that forms a tubular structure through which the fluid moves. Sensor 10 is placed in the inside diameter (ID) of tubing string 26 such that a floating head of sensor 10 is adjacently positioned to the general plane of the fluid flow and such that pressure gradients or shear gradients within tubing string 26 caused by the fluid flow can cause movement of the floating head. As the fluid flows across sensor 10, the direction and drag force of the flow are measured at the inner wall of tubing string 26 and are used to calculate the velocity of the fluid. In a preferred embodiment, a plurality of sensors 10 is distributed around the circumference of tubing string 26 to interpret the shear forces exerted on the surface of the tubing string 26 by the fluid at a particular cross sectional slice of wellbore 24.

Figure 3:
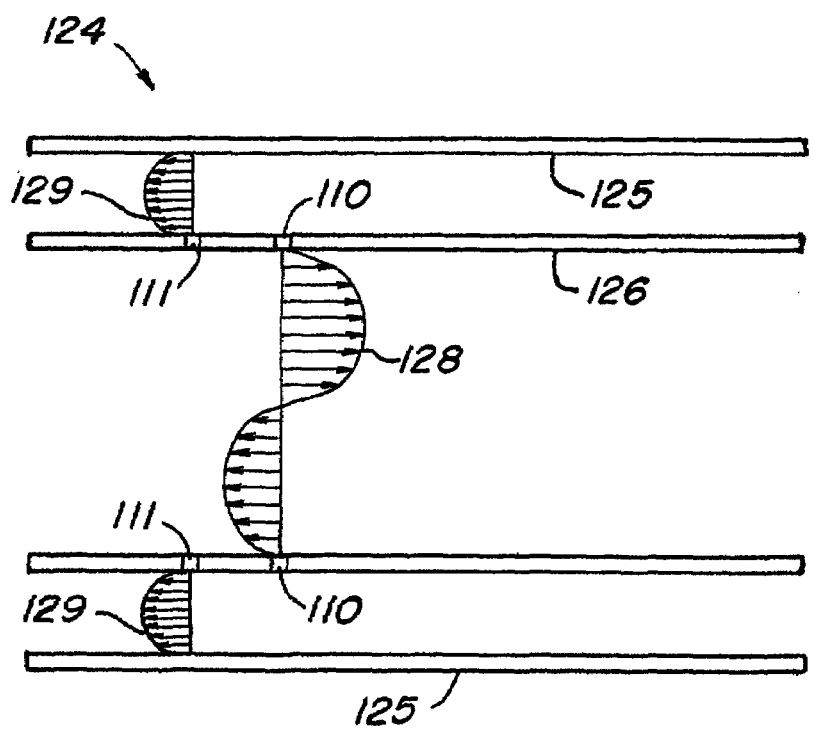
FIG. 3 is a schematic view of a cross section of a tubing string through which a first fluid flows concentrically disposed within a casing to define an annulus through which a second fluid flows.

In FIG. 3, an alternate embodiment of a wellbore is shown generally at 124. Wellbore 124 comprises a tubing string 126 disposed substantially concentrically within a casing 125 to define an annulus therebetween. Fluids (not shown) flow within both the annulus and tubing string 126. A first flow profile, shown at 128, is characteristic of a first fluid flow within tubing string 126, and a second flow profile, shown at 129, is characteristic of a second fluid flow within the annulus. In a manner similar to that as stated above with reference to FIG. 2, a first sensor 110 is placed within a wall of tubing string 126 such that a floating head thereof is engagable by the fluid flow within tubing string 126. A second sensor 111 is then placed within the wall of tubing string 126 such that a floating head thereof is engagable by the fluid flow within the annulus. In a preferred embodiment, a plurality of first sensors 110 is distributed around the inner circumference of tubing string 126 to interpret the shear forces of the fluid flow within tubing string 126 at a particular cross sectional slice of wellbore 124, while a plurality of second sensors 111 is distributed around the circumference of tubing string 126 to interpret the shear forces of the fluid flow within the annulus. Although depicted as being longitudinally displaced from each other in FIG. 3, first sensors 110 and second sensors 111 may be arranged such that sensors 110, 111 are disposed within a single cross sectional slice of the wall of tubing string 126, and may be arranged in a variety of patterns.

Figure 4A:
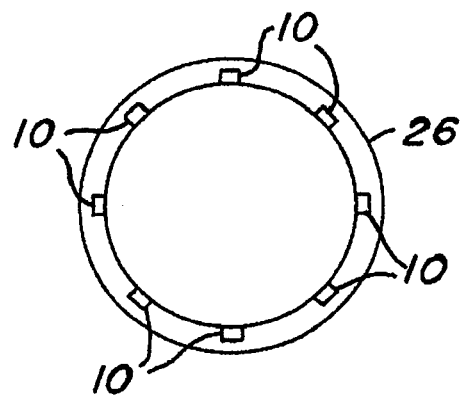
FIG. 4A is an elevation view of a cross section of a tubing string having a plurality of fiber optic skin friction sensors disposed therearound configured to monitor a fluid flow within the tubing string.
Figure 4B:
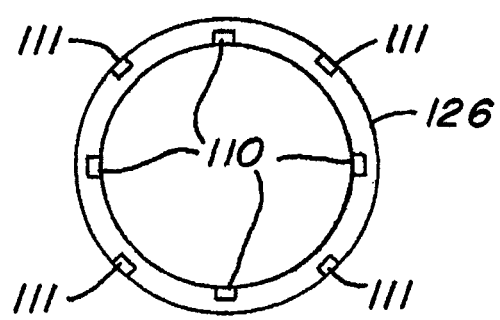
FIG. 4B is an elevation view of a cross section of a tubing string having a plurality of fiber optic skin friction sensors disposed therearound configured in an alternating pattern to monitor a first fluid flow within the tubing string and a second fluid flow outside the tubing string.

Referring now to FIGS. 4A and 4B, arrangements of sensors 10 and alternating configurations of first sensors 110 and second sensors 111 are shown on cross sections of tubing strings 26, 126. In FIG. 4A, an arrangement of sensors 10 is illustrated in which sensors 10 are each positioned to respond to a fluid flow (not shown) within tubing string 26. Although only eight sensors are depicted, any number of sensors may be incorporated into any particular cross section of tubing string 26. In FIG. 4B, an arrangement of alternating first sensors 110 and second sensors 111 is shown in which first sensors 110 are positioned to respond to a fluid flow (not shown) within tubing string 126 and second sensors 111 are positioned to respond to a fluid flow (not shown) adjacent to the outside surface of tubing string 126. In either FIG. 4A or FIG. 4B, at least one of the sensors of the arrangement may be another type of sensor configured to measure various parameters of downhole fluids including, but not limited to, chemical species, pressure, temperature, and density.

Figure 5:
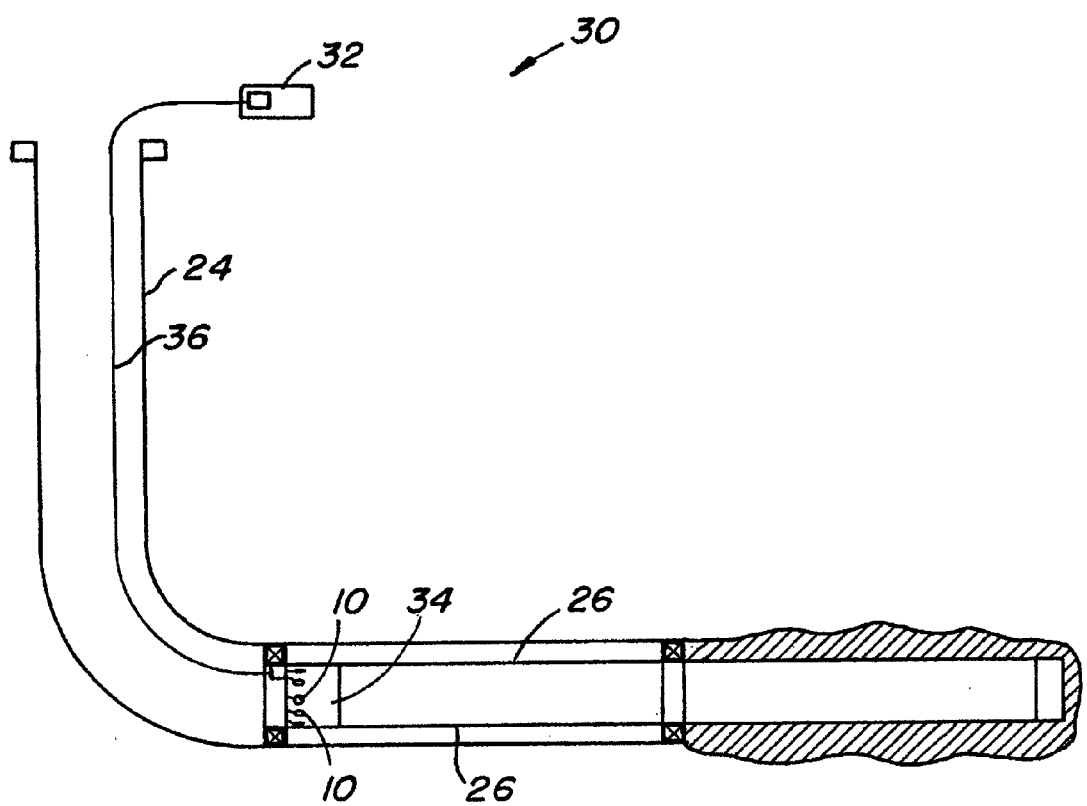
FIG. 5 is a schematic view of a wellbore incorporating a fiber optic flow characterization system for monitoring fluid flow in the wellbore.

Referring to FIG. 5, a fiber optic flow characterization system for a wellbore is shown generally at 30 and is hereinafter referred to as "system 30". System 30 comprises a fiber optic sensing demodulator instrument 32, flow monitoring equipment 34 disposed within wellbore 24, and a fiber optic communications cable 36 connecting fiber optic sensing demodulator instrument 32 and flow monitoring equipment 34 to provide informational communication therebetween. Flow monitoring equipment 34 typically includes sensing locations distributed about the circumference of tubing string 26 within wellbore 24, as described with reference to the foregoing FIGS. 4A and 4B. In system 30, the sensing locations of flow monitoring equipment 34 preferably include fiber optic skin friction sensors 10 (sensors 10), as described above with reference to FIG. 1 through 4.

Fiber optic demodulator instrument 32 provides a light source to sensors 10 and converts a return signal from each sensor 10 to the required measurement data, which is typically drag force and direction of drag force. From such data, analysis software associated with fiber optic demodulator instrument 32 manipulates the measurement data to provide fluid flow characteristics data to the operator. Fiber optic demodulator instrument 32 is preferably located at the well head or at least at the surface of wellbore 24, but may, however, be located downhole proximate flow monitoring equipment 34 or at any point between flow monitoring equipment 34 and the surface. Alternately, fiber optic demodulator instrument 32 may be located at any point distant from wellbore 24.

In alternate embodiments of system 30 (reference made to FIG. 1 as the device appears identical wherein each of the fiber optic connectors and implements are substituted by electrical conductors and implements), the fiber optic configurations may be substituted with electrical sensors and electrical systems. For example, the movement of floating heads of electrical Sensors may be converted into electrical signals, which in turn may be transmitted through conventional electrical wiring to a non-fiber optic demodulator instrument that converts die electrical signal to the required measurement data.

In any of the foregoing embodiments, the required measurement data typically includes the fluid flow rate and direction of flow at each sensing point around the circumference of the tubing string. This data can be determined and characterized in order to provide accurate modeling of fluid flow in the downhole environment. In particular, for known viscosity and density of the fluid, the flow rate of the fluid in the tubing string can be quantified. On the other hand, if the total flow rate of the fluid is known (a value that is typically obtained from a flow metering device) or if fractional flow is derived from individual or combined sensor data, then the viscosity and density of the fluid in the tubing string can be quantified. For more complex fluid flow situations involving multiple phases or particulate matter, multiple sensing points may be installed within the fiber optic flow characterization system for the wellbore to provide data sufficient for the calculation of the desired measurement data.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A system for monitoring fluid flow characteristics in a wellbore, comprising:
    a signal sensing demodulator device; and
    a plurality of skin friction sensing devices circumferentially arranged about a cross section of a tubing string in said wellbore and each having a floating sensor head coplanar with a wall of said tubing string to measure skin friction occurring directly on said wall of the tubing string and being in informational communication with said signal sensing demodulator device, said skin friction sensing devices being engageable by at least one fluid flowing adjacent to at least one of either an inside surface of said tubing string and an outside surface of said tubing string.

2. The system for monitoring fluid flow characteristics in a wellbore as in claim 1 wherein said signal sensing demodulator device is located at a surface location relative to said wellbore.

3. The system for monitoring fluid flow characteristics in a wellbore as in claim 1 wherein said signal sensing demodulator device is located at a downhole location relative to said wellbore.

4. A system for monitoring fluid flow characteristics in a wellbore, comprising:
    a fiber optic sensing demodulator device; and
    a plurality of fiber optic skin friction sensing devices circumferentially arranged about a cross section of a tubing string in said wellbore and each having a floating sensor head coplanar with a wall of said tubing string to measure skin friction occurring directly on said wall of the tubing string and being in informational communication with said fiber optic sensing demodulator device.

5. The system for monitoring fluid flow characteristics in a wellbore as in claim 4 wherein said fiber optic skin friction sensing device is mounted within a surface of said tubing string in said wellbore, said fiber optic skin friction sensing devices being engageable by a fluid flowing adjacent to said tubing string.

6. The system for monitoring fluid flow characteristics in a wellbore as in claim 4 wherein said fiber optic sensing demodulator device is located at a surface location relative to said wellbore.

7. The system for monitoring fluid flow characteristics in a wellbore as in claim 4 wherein said fiber optic sensing demodulator device is located at a downhole location relative to said wellbore.

8. The system for monitoring fluid flow characteristics in a wellbore as in claim 4 wherein said informational communication between said fiber optic sensing demodulator device and said plurality of fiber optic skin friction sensing devices is maintained through a fiber optic communication means.

9. A method for determining fluid flow characteristics in a wellbore, comprising:
    exposing a plurality of skin friction sensing devices circumferentially arranged about a cross section of a tubing string to a fluid flow, the devices each having a floating sensor head coplanar with a wall of the tubing string to measure skin friction occurring directly on said wall of the tubing string;
    transmitting a signal obtained as a result of a movement of said skin friction sensing devices from said fluid flow to a signal sensing demodulator device;
    converting said signal to a numerical value; and
    computing a parameter of said fluid flow in said wellbore from said numerical value.

10. The method for determining fluid flow characteristics in a wellbore as in claim 9 wherein said exposing further comprises measuring a direction of said fluid flow and a drag force associated with said fluid flow.

11. The method for determining fluid flow characteristics in a wellbore as in claim 9 wherein said exposing further comprises measuring a magnitude and direction of drag forces associated with said fluid flow.

12. A method for determining fluid flow characteristics in a wellbore, comprising:
    exposing a plurality of fiber optic skin friction sensing devices circumferentially arranged about a cross section of a tubing string to a fluid flow, the devices having a floating sensor head coplanar with a wall of a tubing string to measure skin friction occurring directly on said wall of the tubing string;
    transmitting a signal obtained as a result of a movement of said fiber optic skin friction sensing devices from said fluid flow to a fiber optic sensing demodulator device;
    converting said signal to a numerical value; and
    computing a parameter of said fluid flow in said wellbore from said numerical value.

13. The method for determining fluid flow characteristics in a wellbore as in claim 12 wherein said exposing further comprises measuring a direction of said fluid flow and a drag force associated with said fluid flow.

14. The method for determining fluid flow characteristics in a wellbore as in claim 12 wherein said transmitting of said signal to said fiber optic sensing demodulator device is through a fiber optic communications cable.

15. The method for determining fluid flow characteristics in a wellbore as in claim 12 wherein said exposing further comprises measuring a magnitude and direction of drag forces associated with said fluid flow.

* * * * *